US012055107B2

(12) United States Patent
Ambaliya et al.

(10) Patent No.: US 12,055,107 B2
(45) Date of Patent: Aug. 6, 2024

(54) INTELLIGENT ENGINE AND PUMP CONTROLS

(71) Applicant: Cummins Inc., Columbus, IN (US)

(72) Inventors: Chirag Dhirajlal Ambaliya, Indianapolis, IN (US); Randal L. Bergstedt, Columbus, IN (US); Sunil Dhulipati, Indianpolis, IN (US); Hari Donepudi, Columbus, IN (US); Rohit Saha, Columbus, IN (US); Jagdeep I. Singh, Columbus, IN (US); Sumit Tripathi, Columbus, IN (US)

(73) Assignee: Cummins Inc., Columbus, IN (US)

( * ) Notice: Subject to any disclaimer, the term of this patent is extended or adjusted under 35 U.S.C. 154(b) by 503 days.

(21) Appl. No.: 17/420,186

(22) PCT Filed: Dec. 30, 2019

(86) PCT No.: PCT/US2019/068885
§ 371 (c)(1),
(2) Date: Jul. 1, 2021

(87) PCT Pub. No.: WO2020/146159
PCT Pub. Date: Jul. 16, 2020

(65) Prior Publication Data

US 2022/0090544 A1 Mar. 24, 2022

Related U.S. Application Data

(60) Provisional application No. 62/789,721, filed on Jan. 8, 2019.

(51) Int. Cl.
*F02D 29/04* (2006.01)
*F02D 1/02* (2006.01)
(Continued)

(52) U.S. Cl.
CPC ............... *F02D 29/04* (2013.01); *F02D 1/02* (2013.01); *F02D 29/02* (2013.01); *F02D 31/002* (2013.01);
(Continued)

(58) Field of Classification Search
CPC . F02D 29/04; F02D 1/02; F02D 29/02; F02D 33/02; F02D 31/002; F02D 31/007;
(Continued)

(56) References Cited

U.S. PATENT DOCUMENTS 4,773,369 A 9/1988 Kobayashi et al.
5,468,126 A 11/1995 Lukich
(Continued)

FOREIGN PATENT DOCUMENTS

CN 101855435 A 10/2010
CN 102849061 A 1/2013
(Continued)

OTHER PUBLICATIONS

Chinese Office Action from CN Appl. No. 201980088448.4 mailed Nov. 3, 2022, with English translation (12 pages).
(Continued)

*Primary Examiner* — Dominick L Plakkoottam
(74) *Attorney, Agent, or Firm* — FOLEY & LARDNER LLP

(57) ABSTRACT

A method includes detecting a change in a loading condition on an engine based on use of an implement system including a pump driven by the engine, an actuator fluidly coupled to the pump, and an implement repositionable with the actuator. The change in the loading condition is detected based on a variation in a command signal from a joystick that controls movement of the implement, an outlet pressure of the pump, a displacement of the pump, and/or an engagement signal of a clutch positioned to selectively couple the pump to the
(Continued)

engine. The method further includes commanding a fueling system to increase an amount of fuel provided to the engine and/or an air handling system of the machine to increase an amount of air and/or a boost pressure of the air provided to the engine in response to detection of an increasing loading condition based on the variation.

20 Claims, 4 Drawing Sheets

(51) Int. Cl.
*F02D 29/02* (2006.01)
*F02D 31/00* (2006.01)
*F02D 33/02* (2006.01)
*F04B 17/05* (2006.01)
*F04B 49/08* (2006.01)

(52) U.S. Cl.
CPC ........... *F02D 31/007* (2013.01); *F02D 33/02* (2013.01); *F04B 17/05* (2013.01); *F04B 49/08* (2013.01)

(58) Field of Classification Search
CPC ...... F02D 41/045; F02D 41/021; F04B 17/05; F04B 49/08; F04B 49/02
See application file for complete search history.

(56) References Cited

U.S. PATENT DOCUMENTS

| | | | | |
|---|---|---|---|---|
| 5,525,043 | A * | 6/1996 | Lukich | F02D 31/007 60/431 |
| 5,951,258 | A | 9/1999 | Lueschow et al. | |
| 7,519,462 | B2 | 4/2009 | Brown et al. | |
| 7,822,532 | B2 | 10/2010 | Hoff et al. | |
| 7,832,208 | B2 | 11/2010 | Peterson et al. | |
| 7,891,182 | B2 | 2/2011 | Kelly et al. | |
| 8,261,717 | B2 | 9/2012 | Peotter et al. | |
| 8,695,566 | B2 | 4/2014 | Kawaguchi et al. | |
| 8,726,664 | B2 | 5/2014 | Narazaki et al. | |
| 8,874,327 | B2 | 10/2014 | Ishihara et al. | |
| 9,309,969 | B2 | 4/2016 | Wu et al. | |
| 9,446,769 | B2 | 9/2016 | Yun et al. | |
| 10,557,251 | B2 * | 2/2020 | Imura | E02F 9/2292 |
| 10,913,441 | B2 * | 2/2021 | Saha | B60W 30/188 |
| 2004/0098984 | A1 | 5/2004 | Duell et al. | |
| 2009/0120083 | A1 * | 5/2009 | Peterson | E02F 9/2296 60/449 |
| 2009/0163318 | A1 | 6/2009 | Matsuyama | |
| 2010/0235066 | A1 | 9/2010 | Hill | |
| 2010/0332102 | A1 | 12/2010 | Akiyama et al. | |
| 2013/0104532 | A1 * | 5/2013 | Ries | F16H 61/47 60/491 |
| 2013/0110363 | A1 * | 5/2013 | Ries | B60W 10/103 701/54 |
| 2013/0168179 | A1 * | 7/2013 | Will | F16H 61/431 180/338 |
| 2014/0032057 | A1 * | 1/2014 | Li | E02F 9/2246 701/50 |
| 2015/0232269 | A1 * | 8/2015 | Hou | F15B 11/0423 60/431 |
| 2015/0267719 | A1 * | 9/2015 | Gorman | E02F 9/2066 60/327 |
| 2016/0290369 | A1 | 10/2016 | Opdenbosch et al. | |
| 2017/0274930 | A1 | 9/2017 | Zhang et al. | |

FOREIGN PATENT DOCUMENTS

| | | | |
|---|---|---|---|
| CN | 102947514 | A | 2/2013 |
| CN | 105683452 | A | 6/2016 |
| EP | 0 404 540 | | 12/1990 |
| KR | 101250083 | | 4/2013 |
| WO | WO-2009/145704 | A1 | 12/2009 |
| WO | WO-2011/140184 | | 11/2011 |
| WO | WO-2012/048588 | A1 | 4/2012 |
| WO | WO-2015/114061 | A1 | 8/2015 |

OTHER PUBLICATIONS

International Search Report and Written Opinion on International Application No. PCT/US2019/068885, mail date Mar. 9, 2020, 12 pages.

* cited by examiner

INTELLIGENT ENGINE AND PUMP CONTROLS

CROSS-REFERENCE TO RELATED PATENT APPLICATION

This application claims the benefit of and priority to U.S. Provisional Patent Application No. 62/789,721, filed Jan. 8, 2019, which is incorporated herein by reference in its entirety.

TECHNICAL FIELD

The present disclosure relates to engine and pump control for machinery. More particularly, the present disclosure relates to intelligently controlling an engine and a pump of a machine to prevent a reduction in engine speed during transient loading.

BACKGROUND

Industrial engines for large machinery (e.g., excavators) often drive hydraulic pumps to operate hydraulic components of the large machinery. Typically, the engines are operated at a fixed engine speed while being commanded by an operator. However, when the engine sees a sudden load, sometimes a noticeable drop in engine speed may occur. Such drops in engine speed can reduce the machinery's capability to adequately respond during transient loading, leading to operator dissatisfaction.

SUMMARY

One embodiment relates to a method. The method includes detecting, by a processing circuit, a change in a loading condition on an engine of a machine based on use of an implement system of the machine. The implement system includes a pump driven by the engine of the machine, an actuator fluidly coupled to the pump, and an implement repositionable with the actuator. The change in the loading condition is detected based on a variation in at least one of (i) a command signal from a joystick that controls movement of the implement, (ii) an outlet fluid pressure of the pump, (iii) a pump displacement of the pump, or (iv) a clutch engagement signal of a clutch positioned to selectively couple the pump to the engine. The method further includes commanding, by the processing circuit, at least one of (i) a fueling system of the machine to increase an amount of fuel provided to the engine by the fueling system or (ii) an air handling system of the machine to increase at least one of (a) an amount of air or (b) a boost pressure of the air provided to the engine by the air handling system in response to detection of an increasing loading condition based on the variation to improve a response of the engine to transient loading by substantially preventing a reduction in engine speed as a result of the transient loading.

Another embodiment relates to a method. The method includes monitoring, by a processing circuit, a loading condition on an engine of a machine based on use of an implement system of the machine; detecting, by the processing circuit, an increase in the loading condition during use of the implement system; providing, by the processing circuit, a first command to a fueling system of the machine to increase an amount of fuel provided to the engine by the fueling system in response to detecting the increase in the loading condition; and providing, by the processing circuit, a second command to an air handling system of the machine to increase at least one of (i) an amount of air or (ii) a boost pressure of the air provided to the engine by the air handling system in response to detecting the increase in the loading condition.

Still another embodiment relates to a system. The system includes a control system for a machine. The machine includes an engine, a pump driven by the engine, an actuator driven by the pump, and an implement manipulated by the actuator. The control system includes a processing circuit having at least one processor coupled to a memory storing instructions therein that cause the at least one processor to monitor a loading condition on the engine based on use of the implement, detect an increase in the loading condition during use of the implement, and provide at least one of (i) a first command to a fueling system of the machine to increase an amount of fuel provided to the engine by the fueling system in response to detecting the increase in the loading condition or (ii) a second command to an air handling system of the machine to increase at least one of (a) an amount of air or (b) a boost pressure of the air provided to the engine by the air handling system in response to detecting the increase in the loading condition.

These and other features, together with the organization and manner of operation thereof, will become apparent from the following detailed description when taken in conjunction with the accompanying drawings.

DETAILED DESCRIPTION

Figure 1:
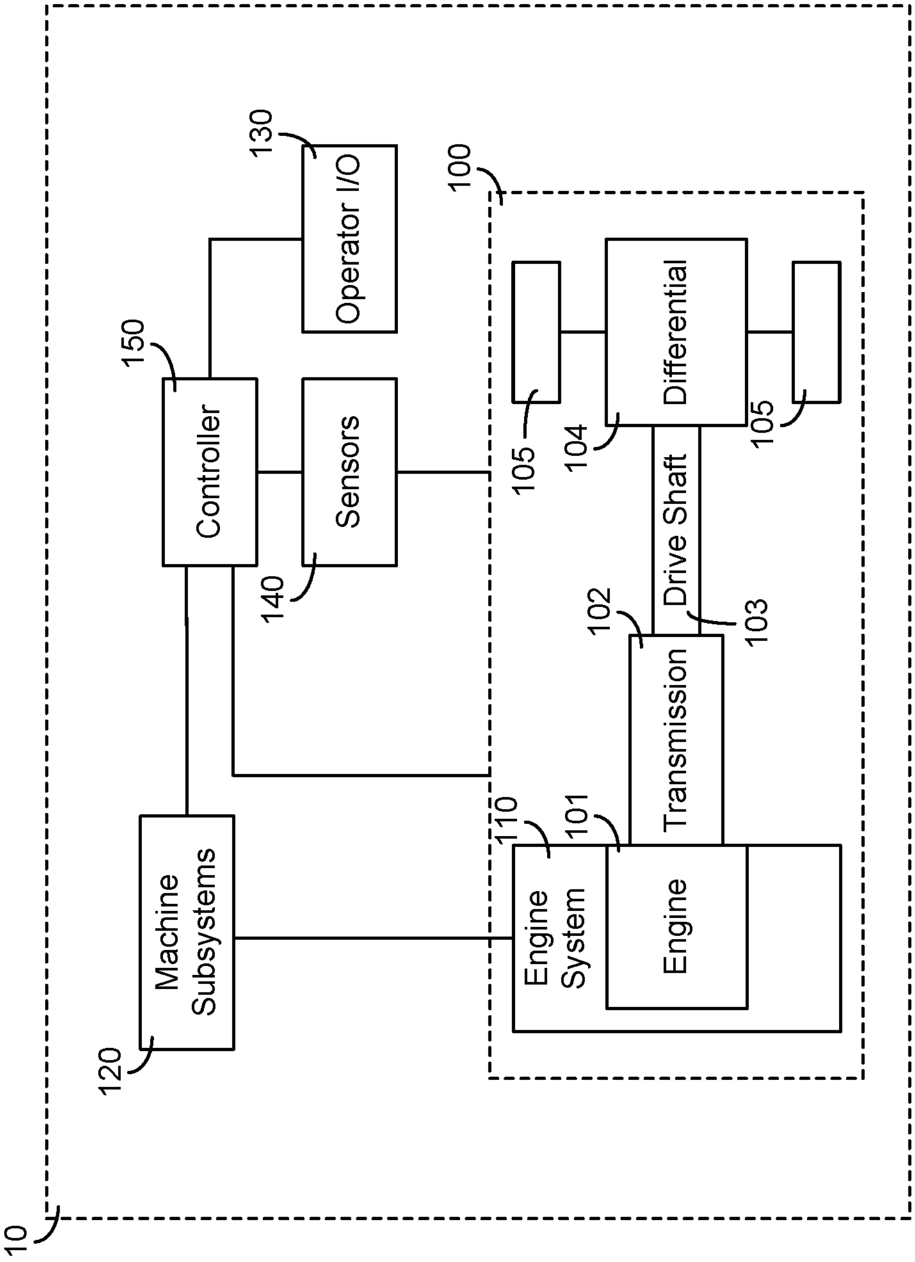
FIG. 1 is a schematic diagram of a machine having a controller and subsystems, according to an example embodiment.

Following below are more detailed descriptions of various concepts related to, and implementations of, methods, apparatuses, and systems for intelligent engine and pump controls for a machine. The various concepts introduced above and discussed in greater detail below may be implemented in any number of ways, as the concepts described are not limited to any particular manner of implementation. Examples of specific implementations and applications are provided primarily for illustrative purposes.

Referring to the Figures generally, the various embodiments disclosed herein relate to systems, apparatuses, and methods for intelligent engine and pump controls for a machine, and more specifically, (i) improving an engine's transient response to sudden loading (i.e., an increase in demand) to prevent dips in engine speed and/or (ii) increasing fuel efficiency of an engine system by reducing engine speed and increasing pump displacement when there is a decrease in demand/loading. Because the transient response of the engine may include significant dips in engine speed during sudden transient and/or increased loading situations, Applicant has developed a control system to minimize such large reductions in engine speed using a two-part control scheme to control the engine and pump of large machinery. As an example, in a scenario where an increased loading condition is expected or detected, the control system may increase fueling and/or airflow into the engine to increase the power and/or torque output of the engine to accommodate the increased loading condition, thereby preventing or substantially preventing a temporary dip in engine speed and performance, and improving the transient performance of the machinery. As another example, in a scenario where a decreased loading condition is expected or detected, the control system may reduce the speed of the engine and increase the displacement of the pump to improve the efficiency of the engine of the machinery.

By way of example, the control system may recognize that a load condition is increasing. Such an increase in demand indicates that an increased hydraulic flow condition is required to meet the demand. According to an example embodiment, to meet the increase in demand, additional fuel is injected into the engine to increase torque. However, in some embodiments, the increased fuel injection may be insufficient on its own. Accordingly, rather than just increasing fueling, the control system may first modify actuator positions (e.g., in a variable-geometry turbocharger (VGT), an exhaust gas recirculation (EGR) system, an intake manifold, etc.) to increase the boost pressure to provide more air into the engine. The control system may then analyze current hydraulic pressures and pump stroke (i.e., displacement) to calculate feed forward fueling needs. Based on the feed forward fueling calculation, the control system will increase fueling accordingly, which thereby increases torque output of the engine to improve the engine's transient response.

By way of another example, the control system may recognize that a load condition is decreasing. Such a decrease in demand indicates that a lower hydraulic flow condition is required to meet the demand. In response to such a decrease in demand, the control system may reduce the speed of the engine and increase the displacement of the pump. Such operation may advantageously reduce the overall fuel consumption of the engine, as well as the pump may be more efficient when operated at higher displacements.

Referring now to FIG. 1, a schematic diagram of a machine 10 with a controller 150 are shown according to an example embodiment. As shown in FIG. 1, the machine 10 generally includes a powertrain 100, machine subsystems 120, an operator input/output (I/O) device 130, sensors 140 communicably coupled to one or more components of the machine 10, and a controller 150. These components are described more fully herein. The machine 10 may be an on-road or an off-road vehicle including, but not limited to, an excavator, a backhoe, a front end loader, a skid loader, large machinery, or any other type of machine or vehicle suitable for the systems described herein. Thus, the present disclosure is applicable with a wide variety of implementations.

Components of the machine 10 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 150 is communicably coupled to the systems and components in the machine 10 of FIG. 1, the controller 150 is structured to receive data regarding one or more of the components shown in FIG. 1. For example, the data may include operation data regarding the operating conditions of the powertrain 100 and/or other components (e.g., an engine, a pump, a clutch, the operator I/O device 130, etc.) acquired by one or more sensors, such as sensors 140. As another example, the data may include an input from operator I/O device 130. The controller 150 may determine how to control the powertrain 100 and/or the machine subsystems 120 based on the operation data.

As shown in FIG. 1, the powertrain 100 includes an engine system 110 including an engine 101, a transmission 102, a driveshaft 103, a differential 104, and a final drive 105. The engine 101 may be structured as any engine type, including a spark-ignition internal combustion engine, a compression-ignition internal combustion engine, and/or a fuel cell, among other alternatives. The engine 101 may be powered by any fuel type (e.g., diesel, ethanol, gasoline, natural gas, propane, hydrogen, etc.). Similarly, the transmission 102 may be structured as any type of transmission, such as a continuous variable transmission, a manual transmission, an automatic transmission, an automatic-manual transmission, a dual clutch transmission, and so on.

Accordingly, as transmissions vary from geared to continuous configurations (e.g., continuous variable transmission), the transmission 102 may include a variety of settings (gears, for a geared transmission) that affect different output speeds based on an input speed received thereby (e.g., from the engine 101, etc.). Like the engine 101 and the transmission 102, the driveshaft 103, the differential 104, and/or the final drive 105 may be structured in any configuration dependent on the application (e.g., the final drive 105 is structured as wheels, track elements, etc.). Further, the driveshaft 103 may be structured as any type of driveshaft including, but not limited to, a one-piece, two-piece, and a slip-in-tube driveshaft based on the application.

According to an example embodiment, the engine 101 receives a chemical energy input (e.g., a fuel such as gasoline, diesel, etc.) and combusts the fuel to generate mechanical energy, in the form of a rotating crankshaft. The transmission 102 receives the rotating crankshaft and manipulates the speed of the crankshaft (e.g., the engine revolutions-per-minute (RPM), etc.) to affect a desired driveshaft speed. The rotating driveshaft 103 is received by the differential 104, which provides the rotation energy of the driveshaft 103 to the final drive 105. The final drive 105 then propels or moves the machine 10.

Referring again to FIG. 1, the machine 10 includes the machine subsystems 120. The machine subsystems 120 may include components including mechanically driven or electrically driven components (e.g., HVAC system, lights, pumps, hydraulics, fans, fueling systems, air handling systems, etc.). The machine subsystems 120 may also include any component used to reduce exhaust emissions, such as selective catalytic reduction (SCR) catalyst, a diesel oxidation catalyst (DOC), a diesel particulate filter (DPF), a diesel exhaust fluid (DEF) doser with a supply of diesel exhaust fluid, a plurality of sensors for monitoring the aftertreatment system (e.g., a nitrogen oxide (NOx) sensor, temperature sensors, etc.), and/or still other components.

The machine subsystems 120 may include one or more electrically-powered accessories and/or engine-drive accessories. Electrically-powered accessories may receive power from an on-board energy storage device and/or generator to facilitate operation thereof. Being electrically-powered, the accessories may be able to be driven largely independent of the engine 101 of the machine 10 (e.g., not driven off of a belt, power-take-off (PTO), etc. coupled to the engine 101). The electrically-powered accessories may include, but are not limited to, air compressors (e.g., for pneumatic devices, etc.), air conditioning systems, power steering pumps, engine coolant pumps, fans, and/or any other electrically-powered accessories. The machine subsystems 120 are described in more detail herein with regards to FIGS. 2 and 3.

Figure 2:
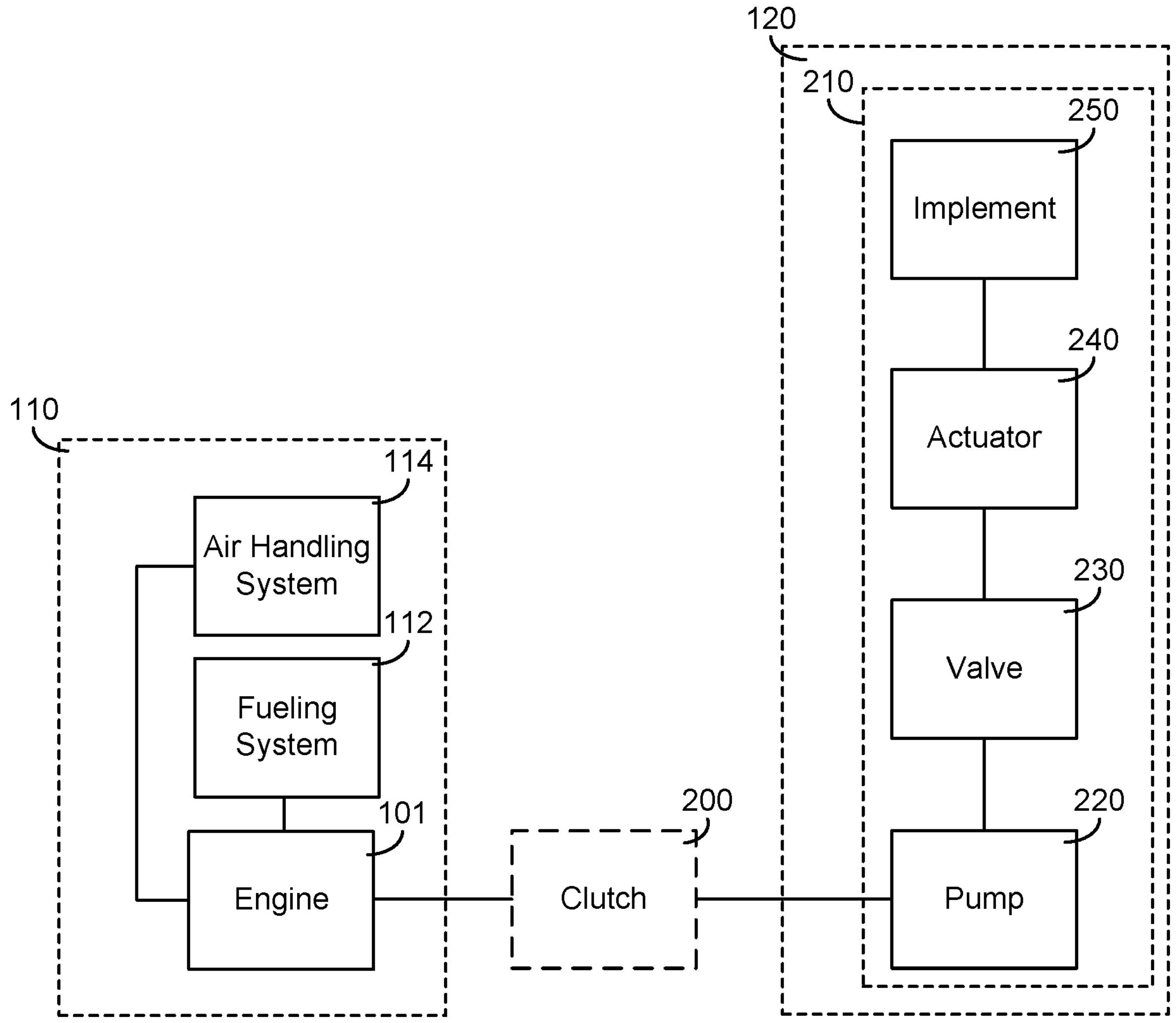
FIG. 2 is a schematic diagram of the subsystems of the machine of FIG. 1, according to an example embodiment.

Referring now to FIG. 2, the machine 10 includes a clutch 200; the engine system 110, which includes the engine 101, a fueling system 112, and an air handling system 114; and the machine subsystems 120, which includes an implement system 210. The implement system 210 includes a pump 220, a valve 230, an actuator 240, and an implement 250. The clutch 200 is positioned to selectively, mechanically couple the pump 220 of the implement system 210 to the engine 101 (e.g., to a PTO thereof, etc.) of the engine system 110. In some embodiments, the machine 10 does not include the clutch 200 such that the engine 101 (e.g., a power-take-off (PTO) thereof, etc.) is directly coupled to the pump 220. According to an example embodiment, the engine 101 drives the pump 220, which thereby drives the actuator 240. By way of example, the pump 220 may be fluidly coupled to a fluid source (e.g., a hydraulic fluid reservoir, etc.) and drive the fluid into the actuator 240 (e.g., a hydraulic cylinder, etc.) to reposition the implement 250. The implement 250 may be any suitable implement useable with the machine 10 described herein. By way of example, the implement 250 may be a bucket implement, a drilling implement, a wrecking ball implement, a crane implement, a grabber implement, and/or still another suitable type of implement.

In one embodiment, the pump 220 is a variable-displacement pump. In such an embodiment, the implement system 210 may or may not include the valve 230. In another embodiment, the pump 220 is a fixed-displacement pump. The valve 230 may be an electrically-controlled variable valve and/or positioned to selectively restrict a flow of fluid provided by the pump 220 to the actuator 240.

The fueling system 112 may include various components that facilitate variably providing fuel to the engine 101. By way of example, the fueling system 112 may include a fuel reservoir, fuel injectors, fuel pumps, and/or other components typically included in vehicle or machine fueling systems.

The air handling system 114 may include various components that facilitate variably providing air (e.g., compressed air, etc.) to the engine 101. In some embodiments, the air handling system 114 includes a forced air induction system. In one embodiment, the forced air induction system includes one or more exhaust driven turbochargers (e.g., a VGT, etc.) and/or one or more electrically driven and exhaust driven turbocharges (e.g., to reduce turbo lag, etc.). In another embodiment, the forced induction system includes one or more conventional engine-driven superchargers and/or one or more electrically-driven superchargers. In other embodiments, the forced induction system includes a combination of turbochargers and superchargers. In some embodiments (e.g., embodiments that include a turbocharger, etc.), the air handling system 114 includes an EGR system (e.g., to drive the turbocharger(s), etc.). In some embodiments, the air handling system 114 includes an air intake manifold for the engine 101. The air handling system 114 may therefore be structured to facilitate selectively varying the amount and/or boost pressure of air entering the combustion chamber of the engine 101.

Referring back to FIG. 1, the operator I/O device 130 may enable an operator of the machine 10 to communicate with the machine 10 and the controller 150. By way of example, the operator I/O device 130 may include, but is not limited to, an interactive display, a touchscreen device, one or more buttons and switches, voice command receivers, and the like. In one embodiment, the operator I/O device 130 includes a brake pedal or lever, an accelerator pedal or throttle, a first joystick (e.g., a movement control joystick, etc.), and/or a second joystick (e.g., an implement control joystick, etc.). By way of example, engaging the first joystick may cause the engine 101 to provide power throughout the powertrain 100 to drive the components thereof (e.g., the transmission 102, the driveshaft 103, the differential 104, the final drive 105, etc.). By way of another example, engaging the second joystick may cause the engine 101 to provide power to the implement system 210 to operate the implement 250 (e.g., dig, lift a bucket, pick up objects, drill, etc.).

The sensors 140 may include sensors positioned and/or structured to monitor operating characteristics of various components of the machine 10. By way of example, the sensors 140 may include a sensor positioned to facilitate monitoring and detecting a load condition on the implement system 210 (e.g., engagement/disengagement of the clutch 200, outlet pressure of the pump 220, displacement of the pump 220, movement of the joystick(s) of the operator I/O device 130, etc.). By way of another example, the sensors 140 may include a sensor positioned to facilitate monitoring operating conditions of the engine 101, the clutch 200, the implement system 210 (e.g., pump 220, the valve 230, the actuator 240, etc.), the fueling system 112, and/or the air handling system 114.

As the components of FIGS. 1 and 2 are shown to be embodied in the machine 10, the controller 150 may be structured as one or more electronic control units (ECUs). As such, the controller 150 may be separate from or included with at least one of a transmission control unit, an exhaust aftertreatment control unit, a powertrain control unit, an engine control unit, etc. The function and structure of the controller 150 is described in greater detail with regards to FIG. 3.

Figure 3:
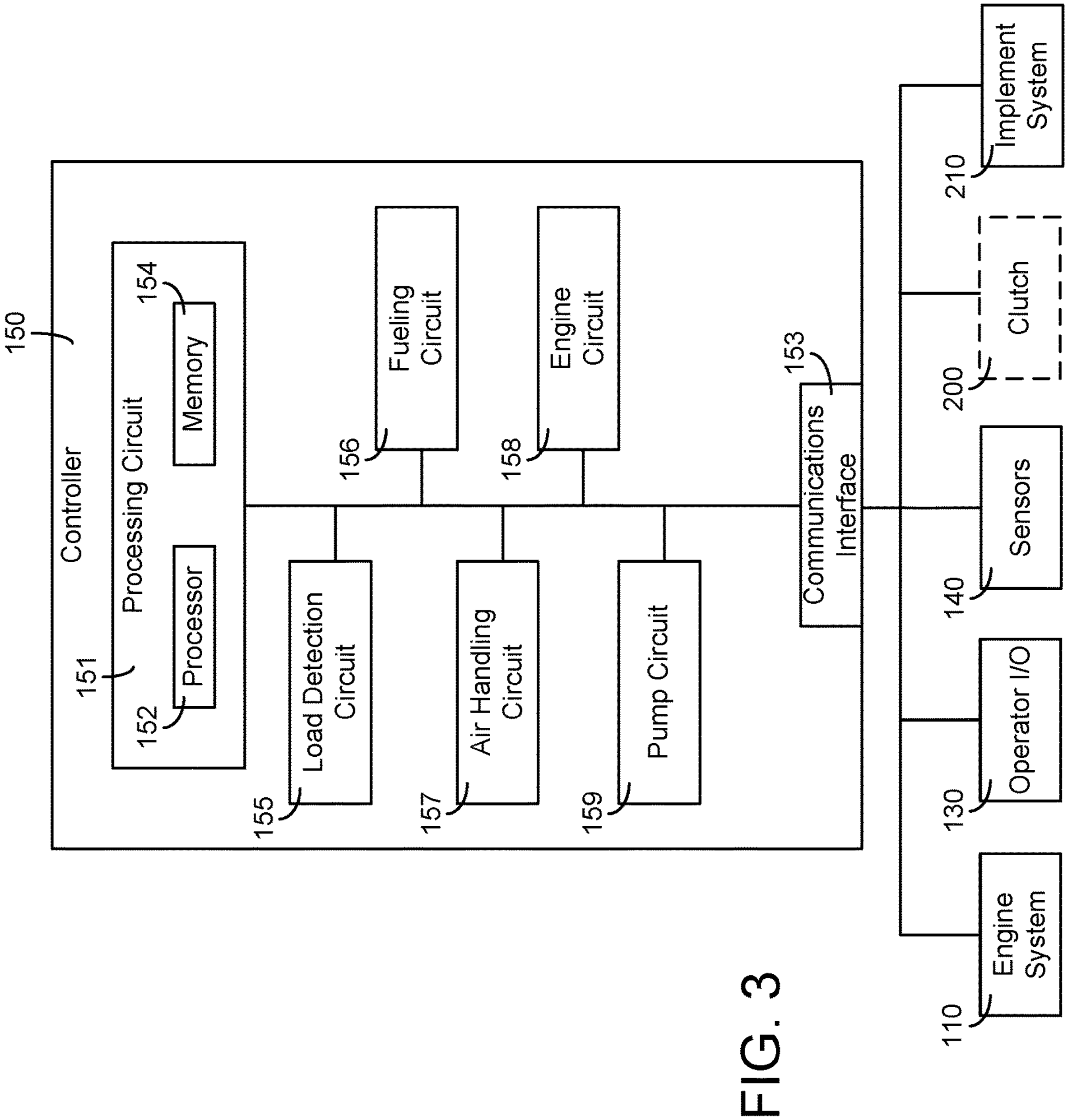
FIG. 3 is a schematic diagram of the controller of the machine of FIG. 1, according to an example embodiment.

Referring now to FIG. 3, a schematic diagram of the controller 150 of the machine 10 of FIG. 1 is shown according to an example embodiment. As shown in FIG. 3, the controller 150 includes a processing circuit 151 having a processor 152 and a memory 154; a load detection circuit 155; a fueling circuit 156; an air handling circuit 157; an engine circuit 158; a pump circuit 159; and a communications interface 153. As described herein, the controller 150 is structured to (i) improve a transient response of the engine 101 to sudden loading (i.e., an increase in demand) to prevent dips in engine speed and/or (ii) increase fuel efficiency of the engine 101 by reducing engine speed (e.g., below a threshold speed, below a typical speed at which the engine 101 is operated at, etc.) and increasing displacement of the pump 220 when there is a decrease in demand (e.g., relative to displacement prior to the decrease in demand, etc.).

In one configuration, the load detection circuit 155, the fueling circuit 156, the air handling circuit 157, the engine circuit 158, and/or the pump circuit 159 are embodied as machine or computer-readable media that is executable by a processor, such as the processor 152. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the load detection circuit 155, the fueling circuit 156, the air handling circuit 157, the engine circuit 158, and/or the pump circuit 159 are embodied as hardware units, such as electronic control units. As such, the load detection circuit 155, the fueling circuit 156, the air handling circuit 157, the engine circuit 158, and/or the pump circuit 159 may be embodied as one or more circuitry components including, but not limited to, processing circuitry, network interfaces, peripheral devices, input devices, output devices, sensors, etc. In some embodiments, the load detection circuit 155, the fueling circuit 156, the air handling circuit 157, the engine circuit 158, and/or the pump circuit 159 may take the form of one or more analog circuits, electronic circuits (e.g., integrated circuits (IC), discrete circuits, system on a chip (SOC) circuits, microcontrollers, etc.), telecommunication circuits, hybrid circuits, and any other type of "circuit." In this regard, the load detection circuit 155, the fueling circuit 156, the air handling circuit 157, the engine circuit 158, and/or the pump circuit 159 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. Thus, the load detection circuit 155, the fueling circuit 156, the air handling circuit 157, the engine circuit 158, and/or the pump circuit 159 may also include programmable hardware devices such as field programmable gate arrays, programmable array logic, programmable logic devices or the like. In this regard, the load detection circuit 155, the fueling circuit 156, the air handling circuit 157, the engine circuit 158, and/or the pump circuit 159 may include one or more memory devices for storing instructions that are executable by the processor(s) of the load detection circuit 155, the fueling circuit 156, the air handling circuit 157, the engine circuit 158, and/or the pump circuit 159. The one or more memory devices and processor(s) may have the same definition as provided below with respect to the memory 154 and the processor 152. Thus, in this hardware unit configuration, the load detection circuit 155, the fueling circuit 156, the air handling circuit 157, the engine circuit 158, and/or the pump circuit 159 may be geographically dispersed throughout separate locations in the machine 10 (e.g., separate control units, etc.). Alternatively, and as shown, the load detection circuit 155, the fueling circuit 156, the air handling circuit 157, the engine circuit 158, and/or the pump circuit 159 may be embodied in or within a single unit/housing, which is shown as the controller 150.

In the example shown, the controller 150 includes the processing circuit 151 having the processor 152 and the memory 154. The processing circuit 151 may be structured or configured to execute or implement the instructions, commands, and/or control processes described herein with respect to the load detection circuit 155, the fueling circuit 156, the air handling circuit 157, the engine circuit 158, and/or the pump circuit 159. Thus, the depicted configuration represents the aforementioned arrangement where the load detection circuit 155, the fueling circuit 156, the air handling circuit 157, the engine circuit 158, and/or the pump circuit 159 are embodied as machine or computer-readable media. However, as mentioned above, this illustration is not meant to be limiting as the present disclosure contemplates other embodiments such as the aforementioned embodiment where the load detection circuit 155, the fueling circuit 156, the air handling circuit 157, the engine circuit 158, and the pump circuit 159, or at least one circuit of the load detection circuit 155, the fueling circuit 156, the air handling circuit 157, the engine circuit 158, and the pump circuit 159, are configured as a hardware unit. All such combinations and variations are intended to fall within the scope of the present disclosure.

The processor 152 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the load detection circuit 155, the fueling circuit 156, the air handling circuit 157, the engine circuit 158, and/or the pump circuit 159 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 154 (e.g., RAM, ROM, Flash Memory, hard disk storage, etc.) may store data and/or computer code for facilitating the various processes described herein. The memory 154 may be communicably connected to the processor 152 to provide computer code or instructions to the processor 152 for executing at least some of the processes described herein. Moreover, the memory 154 may be or include tangible, non-transient volatile memory or non-volatile memory. Accordingly, the memory 154 may include database components, object code components, script components, or any other type of information structure for supporting the various activities and information structures described herein.

The communications interface 153 may include wired or wireless interfaces (e.g., jacks, antennas, transmitters, receivers, transceivers, wire terminals, etc.) for conducting data communications with various systems, devices, or networks. For example, the communications interface 153 may include an Ethernet card and port for sending and receiving data via an Ethernet-based communications network and/or a Wi-Fi transceiver for communicating via a wireless communications network. The communications interface 153 may be structured to communicate via local area networks or wide area networks (e.g., the Internet, etc.) and may use a variety of communications protocols (e.g., IP, local operating network (LON), controller area network (CAN), J1939, local interconnect network (LIN), Bluetooth, ZigBee, radio, cellular, near field communication, etc.).

The communications interface 153 of the controller 150 may facilitate communication between and among the controller 150 and one or more components of the machine 10 (e.g., components of the powertrain 100, the machine subsystems 120, the operator I/O device 130, the sensors 140, etc.). Communication between and among the controller 150 and the components of the machine 10 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a CAN bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The load detection circuit 155 is structured to monitor for and detect a change in a loading condition (e.g., increased loading, decreased loading, sudden loading, etc.) or a lack thereof (e.g., a sustained low loading condition, etc.) on the engine 101 based on operation of the implement system 210. In one embodiment, the load detection circuit 155 is structured to detect a change in the loading condition based on a command signal (e.g., a current signal, via the sensors 140, etc.) from the implement control joystick of the operator I/O device 130. By way of example, the load detection circuit 155 may detect an increasing loading condition in response to the command signal from the implement control joystick indicating that the implement control joystick is moving away from a nominal position (i.e., indicating an increased demand request by the operator). By way of another example, the load detection circuit 155 may detect a decreasing loading condition in response to the command signal from the implement control joystick indicating that the implement control joystick is moving toward the nominal position (i.e., indicating a decreased demand request by the operator). In some embodiments, the command signal has to be present for more than a threshold period of time (e.g., half a second, one second, two seconds, etc.) before a change in the loading condition is treated as valid by the load detection circuit 155 (e.g., to filter out inadvertent movements of the joystick, etc.).

In another embodiment, the load detection circuit 155 is additionally or alternatively structured to detect a change in the loading condition based on the outlet fluid pressure of the pump 220 (e.g., via the sensors 140, etc.). By way of example, the load detection circuit 155 may detect an increasing loading condition in response to the outlet fluid pressure of the pump 220 increasing (i.e., indicating an increased demand request by the operator). By way of example, the load detection circuit 155 may detect a decreasing loading condition in response to the outlet fluid pressure of the pump decreasing (i.e., indicating a decreased demand request by the operator).

In another embodiment, the load detection circuit 155 is additionally or alternatively structured to detect a change in the loading condition based on a pump displacement of the pump 220 (e.g., via the sensors 140, etc.). By way of example, the load detection circuit 155 may detect an increasing loading condition in response to the pump displacement of the pump 220 increasing (i.e., indicating an increased demand request by the operator). By way of example, the load detection circuit 155 may detect a decreasing loading condition in response to the pump displacement of the pump 220 decreasing (i.e., indicating a decreased demand request by the operator).

In another embodiment, the load detection circuit 155 is additionally or alternatively structured to detect a change in the loading condition based on a clutch engagement signal of the clutch 200 (e.g., via the sensors 140, etc.). By way of example, the load detection circuit 155 may detect an increasing loading condition in response to the clutch engagement signal of the clutch 200 indicating that the clutch 200 has been engaged (i.e., indicating that the pump 220 is coupled to the engine 101 and a demand request by the operator has occurred). By way of another example, the load detection circuit 155 may detect a decreasing loading condition in response to the clutch engagement signal of the clutch 200 indicating that the clutch 200 has been disengaged (i.e., indicating that the pump 220 is not coupled to the engine 101 and there is no demand request by the operator). In some embodiments, the load detection circuit 155 is structured to monitor for and detect a change in a loading condition based on two or more of the signal from the implement control joystick, the outlet fluid pressure of the pump 220, the pump displacement of the pump 220, and the clutch engagement signal of the clutch 200 (e.g., both the outlet fluid pressure and the pump displacement, etc.).

In some embodiments, the load detection circuit 155 is structured to detect a sustained low loading condition in response to there being no indication of an increase or decrease in the loading condition on the engine 101 for a threshold period of time and/or the loading on the engine 101 being less than a load threshold. By way of example, the load detection circuit 155 may be structured to identify that a sustained low loading condition is present in response to (i) the command signal from the implement control joystick, (ii) the outlet fluid pressure of the pump 220, (iii) the pump displacement of the pump 220, and/or (iv) the clutch engagement signal of the clutch 200 remaining constant or substantially unchanged for a threshold period of time.

The fueling circuit 156 is structured to control operation of the fueling system 112. By way of example, the fueling circuit 156 may be structured to increase an amount of fuel provided to the engine 101 by the fueling system 112 in response to the load detection circuit 155 detecting an increasing loading condition to (i) prevent or substantially prevent a temporary dip in engine speed and performance and (ii) improve the transient performance of the engine 101, the implement system 210, and the machine 10. By way of another example, the fueling circuit 156 may be structured to decrease an amount of fuel provided to the engine 101 by the fueling system 112 in response to the load detection circuit 155 detecting a decreasing loading condition and/or a sustained low loading condition to increase fuel efficiency of the engine 101.

The air handling circuit 157 is structured to control operation of the air handling system 114. By way of example, the air handling circuit 157 may be structured to increase an amount and/or boost pressure of air provided to the engine 101 by the air handling system 114 in response to the load detection circuit 155 detecting an increasing loading condition to (i) prevent or substantially prevent a temporary dip in engine speed and performance and (ii) improve the transient performance of the engine 101, the implement system 210, and the machine 10. For example, in response to detecting the increased loading condition, the air handling circuit 157 may pre-spool a turbocharger of the air handling system 114 (e.g., by activating an electric motor coupled to a turbocharger of the air handling system 114, by engaging actuators of the EGR system to provide more exhaust flow to the turbocharger of the air handling system 114, by engaging actuators of a VGT of the air handling system 114 to adjust the aspect ratio of the VGT, etc.) to increase boost pressure and prevent or substantially minimize any turbo lag such that engine power is immediately available to perform a requested operation with the implement 250 without causing temporary reduction in engine speed as a result of the increased loading. By way of another example, the air handling circuit 157 may be structured to alter (e.g., decrease, etc.) an amount and/or boost pressure of air provided to the engine 101 by the air handling system 114 (e.g., by reducing turbo speed, etc.) in response to the load detection circuit 155 detecting a decreasing loading condition and/or a sustained low loading condition.

The engine circuit 158 is structured to control operation of the engine 101. By way of example, the engine circuit 158 may be structured to work in conjunction with the fueling circuit 156 and/or the air handling circuit 157 to control the engine 101 in response to the load detection circuit 155 detecting an increased loading condition to accommodate increased fueling and/or airflow provided to the engine 101. By way of another example, the engine circuit 158 may be structured to work in conjunction with the fueling circuit 156 and/or the air handling circuit 157 to control the engine 101 in response to the load detection circuit 155 detecting a decreased loading condition to accommodate decreased fueling and/or airflow provided to the engine 101. For example, the engine circuit 158 may be structured to reduce the speed of the engine 101 in response to the load detection circuit 155 detecting a decreasing loading condition and/or a sustained low loading condition, which may thereby improve the fuel efficiency of the engine 101.

The pump circuit 159 is structured to control operation of the pump 220. By way of example, the pump circuit 159 may be structured to increase the displacement of the pump 220 in response to the load detection circuit 155 detecting a decreasing loading condition and/or a sustained low loading condition. According to an example embodiment, reducing the speed of the engine 101 and increasing the displacement of the pump 220 will reduce the overall fuel consumption of the engine 101, as well as the pump 220 may operate more efficiently at higher displacements (e.g., which may not be able to be used at higher engine speeds, etc.). Further details regarding the function of the controller 150, the load detection circuit 155, the fueling circuit 156, the air handling circuit 157, the engine circuit 158, and the pump circuit 159 is provided herein with regards to FIG. 4.

Figure 4:
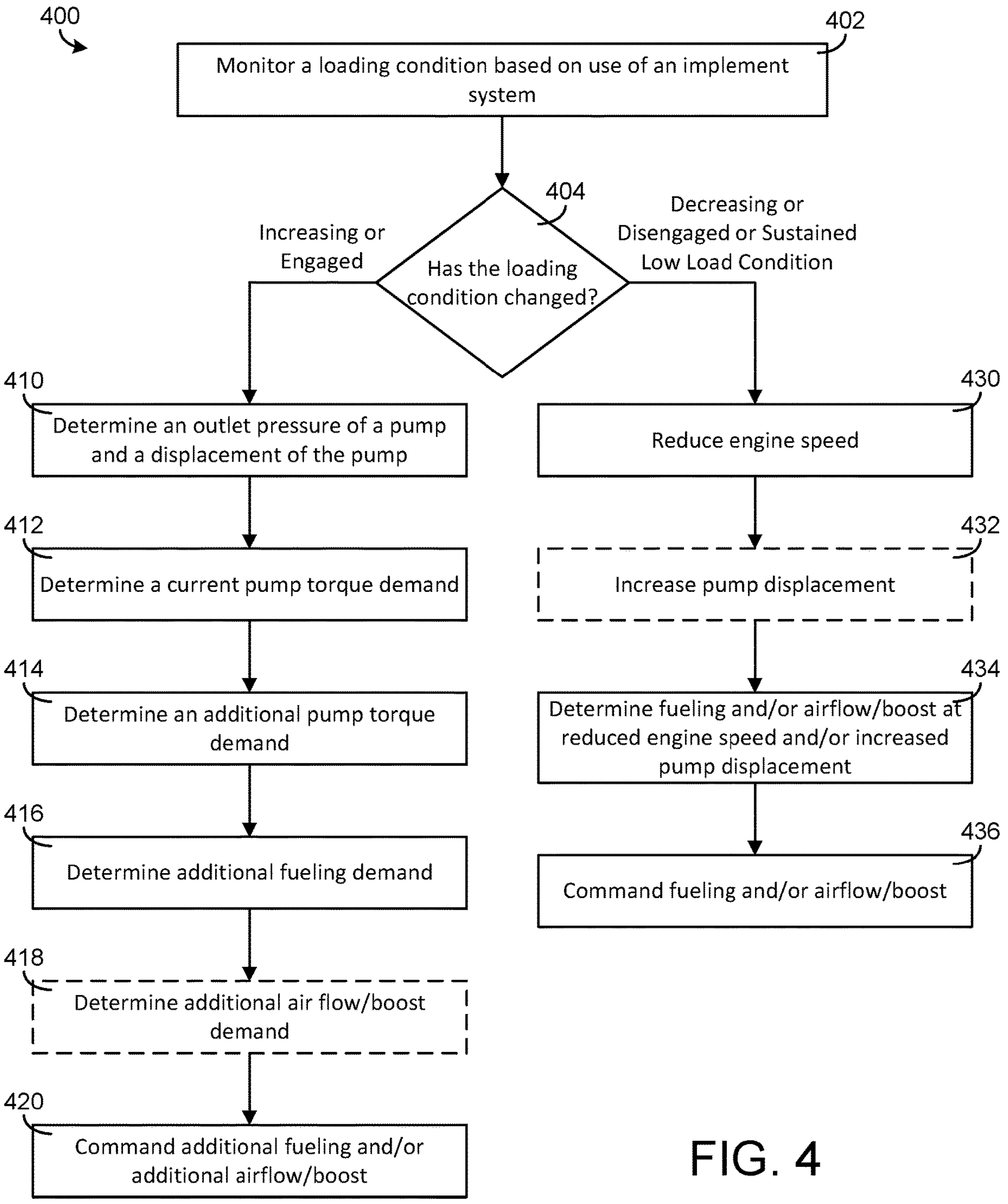
FIG. 4 is a flow diagram of a method for controlling components of a machine to prevent engine speed reduction during transient loading, according to an example embodiment.

Referring now to FIG. 4, a method 400 for controlling components of a machine to prevent engine speed reduction during transient loading is shown according to an example embodiment. In one example embodiment, method 400 may be implemented with the machine 10, the machine subsystems 120, and the controller 150 of FIGS. 1-3. As such, method 400 may be described with regard to FIGS. 1-3.

At process 402, a controller (e.g., the controller 150, the load detection circuit 155, etc.) is structured to monitor a loading condition based on use of an implement system (e.g., the implement system 210, etc.) of a machine (e.g., the machine 10, etc.). In some embodiments, the loading condition is monitored based on a command signal from a joystick that controls movement of an implement (e.g., the implement 250, etc.) of the implement system. In some embodiments, the loading condition is monitored based on an outlet fluid pressure of a pump (e.g., the pump 220, etc.) of the implement system that is driven by an engine (e.g., the engine 101, etc.) of the machine. In some embodiments, the loading condition is monitored based on a pump displacement of the pump. In some embodiments, the loading condition is monitored based on a clutch engagement signal of a clutch (e.g., the clutch 200, etc.) positioned to selectively couple the pump to the engine. In some embodiments, the loading condition is monitored based on a combination of two or more of the command signal from the joystick, the outlet fluid pressure of the pump, the pump displacement of the pump, the clutch engagement signal of the clutch.

At process 404, the controller is structured to determine or detect that the loading condition has changed. According to an example embodiment, a change in the loading condition is detected based on a variation in at least one of (i) the command signal from the joystick, (ii) the outlet fluid pressure of the pump, (iii) the pump displacement of the pump, or (iv) the clutch engagement signal of the clutch. The controller is structured to proceed to process 410 in response to (i) the command signal from the joystick, the outlet fluid pressure of the pump, and/or the pump displacement of the pump increasing and/or (ii) the clutch engagement signal of the clutch indicating that the clutch has been engaged (from a disengaged configuration). Alternatively, the controller is structured to proceed to process 430 in response to (i) the command signal from the joystick, the outlet fluid pressure of the pump, and/or the pump displacement of the pump decreasing, (ii) the clutch engagement signal of the clutch indicating that the clutch has been disengaged (from an engaged configuration), and/or (iii) a sustained low load condition (e.g., a command has not been provided to move the implement 250 for a threshold period of time, etc.).

At process 410, the controller (e.g., the pump circuit 159, etc.) is structured to determine the current outlet fluid pressure of the pump and the current pump displacement of the pump. At process 412, the controller (e.g., the pump circuit 159, etc.) is structured to determine a current pump torque demand on the pump (e.g., based on the pump outlet pressure, the pump displacement, command signal from the joystick, etc.). Process 410 and Process 412 may be performed continuously, periodically, and/or simultaneously with process 402. At process 414, the controller (e.g., the pump circuit 159, etc.) is structured to determine an additional pump torque demand required to accommodate an increase in demand (e.g., indicated by a change in the command signal from the joystick, etc.).

At process 416, the controller (e.g., the fueling circuit 156, the engine circuit 158, etc.) is structured to determine an additional fueling demand required to operate the engine to drive the pump to meet the additional pump torque demand. At process 418, the controller (e.g., the air handling circuit 157, the engine circuit 158, etc.) is structured to determine an additional airflow/boost demand required to operate the engine to drive the pump to meet the additional pump torque demand. In some embodiments, process 418 is optional (e.g., if engine fueling changes alone are sufficient, etc.). At process 420, the controller (e.g., the fueling circuit 156, the air handling circuit 157, etc.) is structured to command a fueling system (e.g., the fueling system 112, etc.) and/or an air handling system (e.g., the air handling system 114, etc.) to provide the additional fueling and/or the additional airflow/boost, respectively.

At process 430, the controller (e.g., the engine circuit 158, etc.) is structured to reduce engine speed of the engine (e.g., by a target amount, etc.). At process 432, the controller (e.g., the pump circuit 159, etc.) is structured to increase the pump displacement of the pump (e.g., to accommodate for the reduction in engine speed, etc.). In some embodiments, process 432 is optional (e.g., if current pump displacement and reduced engine speed is sufficient to meet reduced loading, etc.). At process 434, the controller (e.g., the fueling circuit 156, the air handling circuit 157, the engine circuit 158, etc.) is structured to determine fueling and/or airflow/boost required to accommodate the reduced engine speed and/or the increased pump displacement. At process 436, the controller (e.g., the fueling circuit 156, the air handling circuit 157, etc.) is structured to command the fueling system and/or the air handling system to provide fueling (e.g., reduced fueling, etc.) and/or airflow/boost (e.g., reduced airflow/boost, etc.) as needed at the reduced engine speed and/or increased pump displacement.

It should be understood that no claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIG. 3, it should be understood that the controller 150 may include any number of circuits for completing the functions described herein. For example, the activities and functionalities of the load detection circuit 155, the fueling circuit 156, the air handling circuit 157, the engine circuit 158, and/or the pump circuit 159 may be combined in multiple circuits or as a single circuit. Additional circuits with additional functionality may also be included. Further, it should be understood that the controller 150 may further control other activity beyond the scope of the present disclosure.

As mentioned above and in one configuration, the "circuits" may be implemented in machine-readable medium for execution by various types of processors, such as processor 152 of FIG. 3. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, it should be understood that the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

The invention claimed is:

1. A method comprising:

detecting, by a processing circuit, a change in a loading condition on an engine of a machine based on use of an implement system of the machine, the implement system including a pump driven by the engine of the machine, an actuator fluidly coupled to the pump, and an implement repositionable with the actuator, wherein the change in the loading condition is detected based on a variation in at least one of (i) a command signal from a joystick that controls movement of the implement, (ii) an outlet fluid pressure of the pump, (iii) a pump displacement of the pump, or (iv) a clutch engagement signal of a clutch positioned to selectively couple the pump to the engine; and providing, by the processing circuit, a command to an air handling system of the machine to increase at least one of (a) an amount of air or (b) a boost pressure of the air provided to the engine by the air handling system in response to detection of an increase in the loading condition based on the variation in the at least one of (i) the command signal from the joystick, (ii) the outlet fluid pressure, (iii) the pump displacement, or (iv) the clutch engagement signal.

2. The method of claim 1, wherein the change in the loading condition is detected based on the variation in the command signal from the joystick.

3. The method of claim 2, further comprising providing, by the processing circuit, the command in response to the command signal from the joystick being present for a threshold period of time and not providing the command in response to the command signal from the joystick being present for less than the threshold period of time.

4. The method of claim 1, wherein the change in the loading condition is detected based on the variation in the outlet fluid pressure of the pump.

5. The method of claim 1, wherein the change in the loading condition is detected based on the variation in the pump displacement of the pump.

6. The method of claim 1, wherein the change in the loading condition is detected based on the variation in the clutch engagement signal of the clutch.

7. The method of claim 1, wherein the change in the loading condition is detected based on the variation in at least two of (i) the command signal from the joystick, (ii) the outlet fluid pressure of the pump, (iii) the pump displacement of the pump, or (iv) the clutch engagement signal of the clutch.

8. The method of claim 1, further comprising providing, by the processing circuit, a command to a fueling system of the machine to increase an amount of fuel provided to the engine by the fueling system in response to the detection of the increase in the loading condition.

9. The method of claim 1, further comprising:

decreasing, by the processing circuit, the engine speed in response to detection of a decreasing loading condition; and increasing, by the processing circuit, the pump displacement of the pump in response to the detection of the decreasing loading condition.

10. The method of claim 9, further comprising at least one of:

decreasing, by the processing circuit, the amount of the fuel provided to the engine by the fueling system in response to the detection of the decreasing loading condition; or decreasing, by the processing circuit, the at least one of the amount of the air or the boost pressure of the air provided to the engine by the air handling system in response to the detection of the decreasing loading condition.

11. The method of claim 1, further comprising:

detecting, by the processing circuit, a low loading condition in response to (i) there being no indication of an increase or a decrease in the loading condition on the engine for a threshold period of time and (ii) the loading on the engine being less than a load threshold; and in response to detecting the low loading condition, at least one of:

decreasing, by the processing circuit, the engine speed;

increasing, by the processing circuit, the pump displacement of the pump;

decreasing, by the processing circuit, the amount of the fuel provided to the engine; or decreasing, by the processing circuit, the at least one of the amount of the air or the boost pressure of the air provided to the engine by the air handling system.

12. The method of claim 1, further comprising:

determining, by the processing circuit, a current pump torque demand on the pump; and determining, by the processing circuit, an increase in the current pump torque demand based on the increase in the loading condition;

wherein the command is based on the increase in the current pump torque demand.

13. A method comprising:

monitoring, by a processing circuit, a loading condition on an engine of a machine based on use of an implement system of the machine;

detecting, by the processing circuit, an increase in the loading condition during use of the implement system;

providing, by the processing circuit, a first command to a fueling system of the machine to increase an amount of fuel provided to the engine by the fueling system in response to detecting the increase in the loading condition; and providing, by the processing circuit, a second command to an air handling system of the machine to increase at least one of (i) an amount of air or (ii) a boost pressure of the air provided to the engine by the air handling system in response to detecting the increase in the loading condition.

14. The method of claim 13, further comprising:

providing, by the processing circuit, the first command and the second command to the fueling system and the air handling system, respectively, in response to detecting that the increase in the loading condition is greater than a threshold amount; and providing, by the processing circuit, the first command or the second command to the fueling system or the air handling system, respectively, in response to detecting that the increase in the loading condition is less than the threshold amount.

15. A system comprising:

a control system for a machine including an engine, a pump driven by the engine, an actuator driven by the pump, and an implement manipulated by the actuator, the control system including a processing circuit having at least one processor coupled to a memory storing instructions therein that cause the at least one processor to:

monitor a loading condition on the engine based on use of the implement;

detect an increase in the loading condition during use of the implement; and provide at least one of:

(i) a first command to a fueling system of the machine to increase an amount of fuel provided to the engine by the fueling system in response to detecting the increase in the loading condition; or (ii) a second command to an air handling system of the machine to increase at least one of (a) an amount of air or (b) a boost pressure of the air provided to the engine by the air handling system in response to detecting the increase in the loading condition;

wherein the instructions further cause the at least one processor to:

provide the first command or the second command to the fueling system or the air handling system, respectively, based on the increase in the loading condition being less than a threshold amount; and provide the first command and the second command to the fueling system and the air handling system, respectively, based on the increase in the loading condition being greater than the threshold amount.

16. The system of claim 15, wherein the increase in the loading condition is detected based on a variation in at least one of (i) a command signal from a joystick that controls movement of the implement, (ii) an outlet fluid pressure of the pump, (iii) a pump displacement of the pump, or (iv) a clutch engagement signal of a clutch positioned to selectively couple the pump to the engine.

17. The system of claim 15, wherein the machine further includes a sensor configured to facilitate detecting the increase in the loading condition.

18. A method comprising:

detecting, by a processing circuit, a change in a loading condition on an engine of a machine based on use of an implement system of the machine, the implement system including a pump driven by the engine of the machine, an actuator fluidly coupled to the pump, and an implement repositionable with the actuator, wherein the change in the loading condition is detected based on a variation in a command signal from a joystick that controls movement of the implement; and providing, by the processing circuit, a command to at least one of (i) a fueling system of the machine to increase an amount of fuel provided to the engine by the fueling system or (ii) an air handling system of the machine to increase at least one of (a) an amount of air or (b) a boost pressure of the air provided to the engine by the air handling system in response to the command signal from the joystick being present for a threshold period of time and not providing the command in response to the command signal from the joystick being present for less than the threshold period of time.

19. The method of claim 18, further comprising providing, by the processing circuit, the command to the air handling system in response to the detection of the increase in the loading condition.

20. The method of claim 18, further comprising providing, by the processing circuit, the command to both the fueling system and the air handling system in response to the detection of the increase in the loading condition.

* * * * *